United States Patent Office 3,361,784
Patented Jan. 2, 1968

3,361,784
POLYMER STABILIZATION
Kurt W. Leu, Amsterdam, Netherlands, assignor to Shell Oil Company, New York, N.Y., a corporation of Delaware
No Drawing. Filed Oct. 9, 1964, Ser. No. 402,924
Claims priority, application Netherlands, Oct. 30, 1963, 299,936
13 Claims. (Cl. 260—45.9)

ABSTRACT OF THE DISCLOSURE

Polyolefins are stabilized against thermal degradation by inclusion of an effective stabilizing amount of a phosphorus-containing carbonamide, e.g., N,N-dihydrocarbyl-omega(dihydrocarbylphosphono)carbonamides, N,N - dihydrocarbyl - omega (dihydrocarbylphosphenyl) carbonamides and N,N - dihydrocarbyl - omega(dihydrocarbylphosphinyl)carbonamides, optionally in combination with phenolic antioxidants.

---

The invention relates to the stabilization of polymers and copolymers of olefinically unsaturated compounds, or, in other words, to the preparation of stable compositions mainly consisting of polymers or copolymers of olefinically unsaturated compounds. The invention is of special importance for the stabilization of polymers and copolymers of alpha-olefins containing from two to four carbon atoms in the molecule.

The stabilization referred to here is in particular the prevention or inhibition of decomposition during treatments requiring elevated temperatures, as in molding at temperatures around 250° C. and higher. The invention, furthermore, relates to the molding of the compositions in question at elevated temperature, in particular molding by processes of extrusion, injection-molding and melt-spinning.

It has been found that very effective stabilization of the polymers and copolymers in question may be achieved by blending the same with one or more phosphorus-containing carbonamides having the general formula:

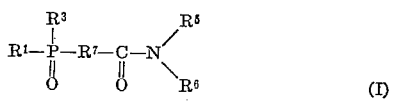

(I)

where $R^1$ is a monovalent hydrocarbon radical or an $OR^2$ group; $R^3$ is a monovalent hydrocarbon radical or an $OR^4$ group; $R^2$, $R^4$ and $R^5$ are similar or dissimilar monovalent hydrocarbon radicals; $R^6$ is hydrogen or a monovalent hydrocarbon radical, with $R^5$ and $R^6$ possibly forming, with the nitrogen atom, a heterocyclic ring which may also contain other heteroatoms besides N; and $R^7$ is a bivalent hydrocarbon radical, and where one or more of the hydrogen atoms in the various hydrocarbon radicals are possibly replaced by other atoms or groups.

These compounds will hereinafter be referred to as phosphonocarbonamides, if $R^1$ is an $OR^2$ group and $R^3$ an $OR^4$ group; as phosphenylcarbonamides, if only one of the symbols $R^1$ and $R^3$ represents an $OR^2$ or $OR^4$ group and the other a monovalent hydrocarbon radical; and as phosphinylcarbonamides, if the symbols $R^1$ and $R^3$ each represent a monovalent hydrocarbon radical.

They may be prepared by reaction of the halocarbon-amide having the general formula:

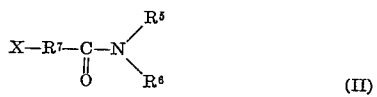

(II)

where $x$ represents a halogen, with a phosphite, phosphonite or phosphinite having the general formula:

(III)

where $R^8$ is a monovalent hydrocarbon radical which may possibly contain one or more substituents, the symbols $R^1$, $R^3$, $R^5$, $R^6$ and $R^7$ having the aforementioned significance.

The various hydrocarbon radicals in the phosphorus-containing carbonamides may be aliphatic or aromatic, or of a mixed aliphatic-aromatic character. The aliphatic radicals or parts of the radicals may be branched or unbranched or cyclic, saturated or unsaturated. The aromatic radicals may be single or condensed nuclei. The various monovalent hydrocarbon radicals will usually contain from 1 to 12 carbon atoms, but may also contain more than 12 carbon atoms. The bivalent hydrocarbon radical $R^7$ will preferably be a polymethylene radical with at least 3 carbon atoms, and usually not more than 20 carbon atoms. Possible substituents in the hydrocarbon radicals include, for example, halogen atoms and hydroxyl groups.

Preferred representative phosphorus-containing carbon-amides for use according to this invention are those listed in Table I, below. Those include the N,N-dialkyl-omega-(dialkylphosphono)alkanoamides, and as a preferred group the N,N-dialkyl-$\gamma$(dialkylphosphono)butyramides, in which the alkyl groups attached to the N-atom are identical and the alkyl groups bridged to the P-atom by oxygen are identical, but not necessarily the same as those attached to N, and in which all alkyl groups have from 2 to 4 carbon atoms and are preferably branched. Another group are the corresponding N-heterocyclic compounds, such as N - piperidyl - $\gamma$(dialkylphosphono) butyramides.

Further included are the corresponding N,N-dialkyl-omega-(dialkylphosphenyl)alkanoamides and N,N - dialkyl-omega-(dialkylphosphinyl) - alkanoamides and their corresponding N-heterocyclic compounds; in these compounds, also, the $\gamma$-butyramides are preferred, and the alkyl groups, when present, preferably have from 2 to 4 carbon atoms and are preferably branched.

The phosphorus-containing carbonamides employed in this invention are believed to be novel compounds. They can be readily prepared by the above-indicated reactions, which are illustrated by the following typical preparation. The compound prepared is N,N-diisopropyl-$\gamma$-(diisopropylphosphono)butyramide, i.e., the compound of the formula

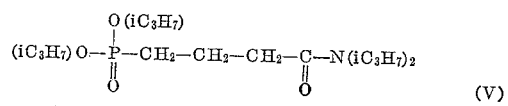

(V)

In terms of Formula I, above, $R^1$ is $OR^2$ where $OR^2$ is an isopropoxy group; $R^3$ is $OR^4$ where $OR^4$ is an isopropoxy group; $R^7$ is a trimethylene radical, and $R^5$ and $R^6$ are isopropyl groups.

This compound is represented in Table I, below, as Compound No. 10. It is prepared as follows:

(a) Freshly melted zinc chloride (1 gram) is mixed with 1 g. mol of butyrolactone, after which 1.4 g. mol of thionyl chloride is added. The mixture is stirred for 24 hours at a temperature of 65° C. until the evolution of sulfur dioxide had ceased. After distillation, 0.71 g. mol of $\gamma$-chlorobutyryl chloride having a boiling point of 72–80° C./12 mm. Hg is obtained.

(b) A quantity of 1 g. mol of $\gamma$-chlorobutyryl chloride is slowly added to a solution of 2 g. mol of diisopropylamine in 700 ml. of petroleum ether, after which the mixture is left to stand for 2 hours at room temperature.

The precipitated hydrochloric acid amine salt is subsequently filtered off and washed twice with 150 ml. of petroleum ether. The petroleum ether is distilled from the filtrate, after which the N,N-diisopropyl-γ-chlorobutyramide is fractioned. Yield: 73% (based on butyryl chloride). Boiling point: 73–75° C./0.05 mm. Hg; $n_D^{20}$=1.4653.

(c) A mixture of 0.3 g. mol of N,N-diisopropyl-γ-chlorobutyramide and 0.3 g. mol of triisopropyl phosphite is heated for 6 hours at 180–220° C., until the theoretical quantity of isopropyl chloride has collected in the cooling trap. After distillation 0.117 g. mol of N,N-diisopropyl-γ-(diisopropoxyphosphono)butyramide is obtained. Boiling point: 138–141° C./0.01 mm. Hg, $n_D^{20}$=1.4537.

The phosphorus-containing carbonamides do not give rise to any discoloration in the mixtures with polymers and copolymers. In many cases their stabilizing effect may be still considerably enhanced by introducing into the compositions to be prepared according to the invention one or more phenols having secondary and/or tertiary hydrocarbon radical substituents in one or more ortho-positions.

These phenols, the so-called sterically-hindered phenols, are, for example, compounds having the formula:

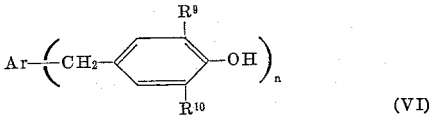

(VI)

where Ar is an aryl nucleus which may contain substituent groups; $R^9$ represents similar or dissimilar secondary and/or tertiary hydrocarbon radicals; $R^{10}$ represents a member of the group consisting of hydrogen atoms and hydrocarbon radicals; and $n$ is a whole number from 1 to 3 inclusive. Ar may also contain a phenolic hydroxyl group. Preferably Ar is a polyalkyl phenyl group containing (6-n) alkyl substituents, particularly lower alkyl, such as methyl or ethyl. Preferred polyphenolic antioxidants of this type are described in more detail in U.S. 3,026,264 to Rocklin et al. and U.S. 3,062,895 to Martin et al.

Very good results have been obtained with compounds having the formula:

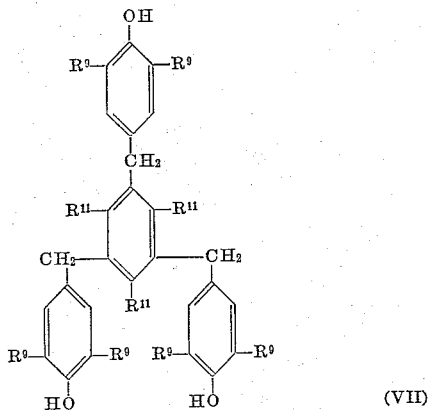

(VII)

where the letters $R^9$ represent similar or dissimilar secondary and/or tertiary alkyl groups each containing not more than 8 carbon atoms, e.g., tert-butyl, and the letters $R^{11}$ similar or dissimilar alkyl groups each containing not more than 4 carbon atoms, e.g., methyl.

Other very serviceable known phenolic antioxidants are those having the formula:

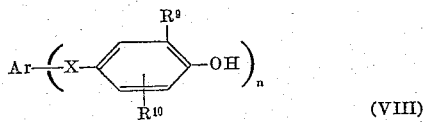

(VIII)

where Ar, $R^9$, $R^{10}$ and $n$ have the same meaning as above, the $R^9$ radicals being branched in the alpha-position and containing from 3 to not more than 8 carbon atoms; and X is an oxygen atom, a sulfur atom, an =NH group or a group =$C_mH_{2m}$ where $m$ is not less than 2. The hydrogen atom of the NH group may be replaced by

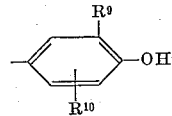

Very serviceable phenolic antioxidants also are those in which there are two arylol nuclei linked together by an oxygen atom, a sulfur atom, an imine group, a methylene or a polymethylene group, and having in the ortho-position relative to the hydroxyl groups present in the aryl nuclei one or more alkyl groups which are branched in the alpha-position.

The substituents in the phenols, which substituents may cause the steric hindrance, are, for example, isopropyl, tert-butyl, tert-phenyl, cyclohexyl, norbornyl and isobornyl.

When the novel stabilizers of this invention are used together with phenolic antioxidants, as just described, still further desirable results may be obtained by including as third stabilizing component one of certain sulfur-containing non-phenolic antioxidant compounds having a sulfide or polysulfide linkage. These compounds are not very effective antioxidants when used by themselves, but often enhance the effectiveness of phenolic antioxidants. A widely used compound of this type is dilauryl thiodipropionate. Other higher dialkyl thiodipropionates, e.g., the distearyl salt, are also very suitable. Another useful group of such sulfur are the dialkyl sulfides and disulfides, e.g., di-n-cetyl sulfide or di-n-hexadecyl disulfide. These sulfur-containing additives are now known as antioxidant stabilizers for polyolefins. They are described in more detail in U.S. application Ser. No. 300,096, filed Aug. 5, 1963, now abandoned. Said application also contains added disclosures with respect to the above-referred-to phenolic antioxidants and with respect to polyolefin substrates to be stabilized. Said application may be referred to for such details if desired, and the pertinent disclosures of said application are incorporated herein by reference.

The polymers which can be stabilized according to this invention are polymers of alpha-monoolefins prepared at low temperatures and pressures in the presence of certain catalyst compositions which are commonly referred to as "Ziegler-type" catalysts, "low-pressure catalysts," or "coordination catalysts."

Polymers produced by use of such catalysts are characterized by a high degree of regularity of their molecules and are termed "stereo-regular, crystallizable, crystalline, linear, low pressure," or "Ziegler" polymers.

A particularly useful low-pressure polymer is highly crystalline or crystallizable isotactic polypropylene. It is characterized, among other things, by a high melting point, i.e., in the order of about 170° C. and improved tensile strength. Although there are various ways of distinguishing this polypropylene from the prior art amorphous type of polypropylene, it is convenient to characterize the crystalline polymer by the proportion of polymer which is insoluble in heptane, amorphous polypropylene being soluble therein. Low-pressure polypropylene prepared with preferred Ziegler-type catalysts contains as much as 90 to 98% or more heptane-insoluble polymer.

The inhibitor systems of this invention are useful in linear polymers of olefins of from 2 to 8 or more carbon atoms per molecule, including polymers of ethylene, butene-1, 4-methyl-pentene-1 and hexene-1, and the like, in crystalline copolymers of propylene with ethylene, butene-1 and the like, and block copolymers of alpha-olefins. While this invention thus applies to polymers of various alpha-monoolefins, the description is directed mainly to polypropylene. Inhibitor systems satisfactory in polypropylene will usually also be satisfactory in other low-pressure polymers. The invention will therefore be explained by reference to stabilization of polypropylene.

As a rule 0.01 to 5 and preferably 0.05 to 1 percent by weight of the phosphorus-containing carbonamides is incorporated in the present compositions. When sterically hindered phenols are added, they are usually added in an amount in the range from 0.01 to 1 and preferably 0.05 to 0.5 percent by weight; non-phenolic sulfur compounds are also suitably added in amounts in the range suitable for phenolic antioxidants.

*Example*

Experiments were carried out with polypropylene that had been prepared with the aid of a catalyst system composed of titanium trichloride and aluminum diethyl chloride.

The polymer powder was mixed with stabilizer and milled for five minutes at 180° C. Plates of the milled sheet, 1 mm. thick, were then kept in a press for 10 minutes at 300° C. under a pressure of 50 kg./cm.$^2$.

The stability of the composition was then assessed by comparing the LVN (limiting viscosity number) before and after heating. For a definition of LVN, see "Encyclopedia of Chemical Technology" by Kirk and Othmer, The Interscience Encyclopedia, Inc., New York, 1963, vol. 10, page 967. The LVN was determined from viscosity measurements at 135° C., in decahydronaphthalene. Polymers stabilized according to this invention were not disclosed.

The stabilizer was a phosphono- or a phosphonylcarbonamide or a combination thereof with a sterically-hindered phenol.

The phosphorus-containing amides used were compounds having the general formula:

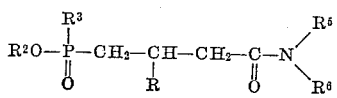

The groups forming the individual amides, which are numbered 1 to 32, are defined in Table I.

TABLE I

| Compound No. | R² | R³ | R | —N(R⁵)(R⁶) |
|---|---|---|---|---|
| 1 | C₂H₅ | R²O | H | N(CH₃)₂ |
| 2 | iso-C₃H₇ | R²O | H | N(CH₃)₂ |
| 3 | n-C₃H₇ | R²O | H | N(CH₃)₂ |
| 4 | iso-C₃H₇ | R²O | H | N(C₂H₅)₂ |
| 5 | n-C₃H₇ | R²O | H | N(C₂H₅)₂ |
| 6 | C₂H₅ | R²O | H | N(iso-C₃H₇)₂ |
| 7 | n-C₃H₇ | R²O | H | N(iso-C₃H₇)₂ |
| 8 | iso-C₃H₇ | R²O | H | N(n-C₃H₇)₂ |
| 9 | n-C₃H₇ | R²O | H | N(n-C₃H₇)₂ |
| 10 | iso-C₃H₇ | R²O | H | N(iso-C₄H₉)₂ |
| 11 | iso-C₃H₇ | R²O | H | N(iso-C₄H₉)₂ |
| 12 | n-C₃H₇ | R²O | H | N(iso-C₄H₉)₂ |
| 13 | C₂H₅ | R²O | H | N(n-C₄H₉)₂ |
| 14 | n-C₃H₇ | R²O | H | N(n-C₄H₉)₂ |
| 15 | iso-C₃H₇ | R²O | H | N(n-C₆H₁₃)₂ |
| 16 | C₂H₅ | R²O | H | —N⟨S⟩ |
| 17 | iso-C₃H₇ | R²O | H | —N⟨S⟩ |
| 18 | n-C₃H₇ | R²O | H | —N⟨S⟩ |
| 19 | C₂H₅ | R²O | H | —N⟨O⟩ |
| 20 | iso-C₃H₇ | R²O | H | —N⟨O⟩ |
| 21 | n-C₃H₇ | R²O | H | —N⟨O⟩ |
| 22 | C₂H₅ | R²O | H | N(CH₃)(C₆H₅) |
| 23 | iso C₃H₇ | R²O | H | N(CH₃)(C₆H₅) |

TABLE I—Continued

| Compound No. | R² | R³ | R | —N(R⁵)(R⁶) |
|---|---|---|---|---|
| 24 | C₂H₅ | R²O | H | N(CH₂—CH=CH₂)₂ |
| 25 | n-C₃H₇ | R²O | H | N(CH₂—CH=CH₂)₂ |
| 25 | iso-C₃H₇ | R²O | H | N(CH₂—CH=CH₂)₂ |
| 26 | iso-C₃H₇ | R²O | H | N(CH₂—CH=CH₂)₂ |
| 27 | iso-C₃H₇ | R²O | H | —N(⟨S⟩)₂ |
| 28 | n-C₃H₇ | R²O | H | —N(⟨S⟩)₂ |
| 29 | iso-C₃H₇ | R²O | H | NH(iso-C₃H₇) |
| 30 | C₂H₅ | R²O | CH₃ | N(iso-C₃H₇)₂ |
| 31 | iso-C₃H₇ | R²O | CH₃ | N(iso-C₃H₇)₂ |
| 32 | C₂H₅ | n-C₄H₉ | H | N(iso-C₃H₇)₂ |

The sterically-hindered phenol used was (a) 2,2'-methylene-bis(4-methyl-6-tert-butylphenol) or
(b) 1,3,5-trimethyl-2,4,6-tri(3,5-di-tert-butyl-4-hydroxybenzyl)benzene.

The type of stabilizer and the amounts applied, together with the LVN-values before and after heating, are given in Table II.

TABLE II

| Phosphono- or phosphonyl-carbonamide | | Phenol | | LVN (dl./g.) | |
|---|---|---|---|---|---|
| Compound No. (as per Table I) | Amount, Percent w. | a or b | Amount, Percent w. | Original | After heating |
| 1 | 0.1 | | | 2.7 | 0.5 |
| 7 | 0.1 | | | 2.7 | 1.4 |
| 8 | 0.1 | | | 2.7 | 1.6 |
| 9 | 0.1 | | | 2.7 | 1.4 |
| 10 | 0.1 | | | 2.7 | 1.4 |
| 11 | 0.1 | | | 2.7 | 1.5 |
| 12 | 0.1 | | | 2.7 | 1.6 |
| 14 | 0.1 | | | 2.7 | 1.5 |
| 15 | 0.1 | | | 2.7 | 1.5 |
| 16 | 0.1 | | | 2.7 | 1.6 |
| 17 | 0.1 | | | 2.7 | 1.6 |
| 18 | 0.1 | | | 2.7 | 1.4 |
| 19 | 0.1 | | | 2.7 | 1.7 |
| 20 | 0.1 | | | 2.7 | 1.6 |
| 21 | 0.1 | | | 2.7 | 1.5 |
| 22 | 0.1 | | | 2.7 | 1.6 |
| 23 | 0.1 | | | 2.7 | 1.6 |
| 24 | 0.1 | | | 2.7 | 1.7 |
| 25 | 0.1 | | | 2.7 | 1.5 |
| 26 | 0.1 | | | 2.7 | 1.7 |
| 28 | 0.1 | | | 2.7 | 1.3 |
| 29 | 0.1 | | | 2.7 | 1.6 |
| 30 | 0.1 | | | 2.7 | 1.5 |
| 31 | 0.1 | | | 2.7 | 1.6 |
| 32 | 0.1 | | | 2.7 | 1.5 |
| | | | | 6.5 | 0.8 |
| 1 | 0.6 | a | 0.8 | 6.5 | 3.2 |
| 9 | 0.6 | a | 0.2 | 6.5 | 3.8 |
| 14 | 0.6 | a | 0.2 | 6.5 | 4.2 |
| 18 | 0.6 | a | 0.2 | 6.5 | 4.3 |
| 22 | 0.6 | a | 0.2 | 6.5 | 3.6 |
| 1 | 0.1 | b | 0.1 | 2.7 | 0.5 |
| 2 | 0.1 | b | 0.1 | 2.7 | 1.7 |
| 3 | 0.1 | b | 0.1 | 2.7 | 1.6 |
| 4 | 0.1 | b | 0.1 | 2.7 | 1.5 |
| 5 | 0.1 | b | 0.1 | 2.7 | 1.6 |
| 6 | 0.1 | b | 0.1 | 2.7 | 1.5 |
| 7 | 0.1 | b | 0.1 | 2.7 | 1.7 |
| 8 | 0.1 | b | 0.1 | 2.7 | 1.8 |
| 9 | 0.1 | b | 0.1 | 2.7 | 1.6 |
| 10 | 0.1 | b | 0.1 | 2.7 | 1.7 |
| 11 | 0.1 | b | 0.1 | 2.7 | 1.6 |
| 12 | 0.1 | b | 0.1 | 2.7 | 1.6 |
| 13 | 0.1 | b | 0.1 | 2.7 | 1.6 |
| 24 | 0.1 | b | 0.1 | 2.7 | 1.7 |
| 27 | 0.1 | b | 0.1 | 2.7 | 1.7 |
| 28 | 0.1 | b | 0.1 | 2.7 | 1.3 |

I claim as my invention:
1. A polyolefin composition stabilized against degradation at elevated temperatures, comprising (a) solid polymer of an alpha-monoolefin of 2 to 8 carbon atoms per molecule combined with (b) an effective amount of a phosphorus-containing carbonamide having the general formula

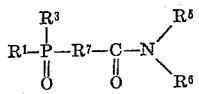

wherein $R^1$ is a radical selected from the group consisting of monovalent hydrocarbon radicals and groups of the formula $—OR^2$; $R^3$ is selected from the group consisting of monovalent hydrocarbon radicals and groups having the formula $—OR^4$; $R^2$, $R^4$ and $R^5$ are monovalent hydrocarbon radicals; $R^6$ is selected from the group consisting of hydrogen and monovalent hydrocarbon radicals; and $R^7$ is a divalent hydrocarbon radical; provided that $R^5$ and $R^6$ may further be selected from the group consisting of divalent radicals which, together with the N atom, form a heterocyclic ring.

2. A composition according to claim 1 wherein $R^7$ is a polymethylene radical having from 3 to 20 carbon atoms.

3. A composition according to claim 1 in which said polyolefin is polypropylene.

4. A composition according to claim 3 containing from 0.01 to 5 percent by weight of said phosphorus-containing carbonamide and from 0.01 to 1 percent by weight of a hindered phenolic polyolefin antioxidant.

5. Polypropylene stabilized against degradation at elevated temperatures, comprising solid polypropylene and a stabilizing amount of an N,N-dialkyl-γ(dialkylphosphono)butyramide wherein each alkyl group has from 1 to 12 carbon atoms.

6. A composition according to claim 5 wherein said alkyl groups have from 2 to 4 carbon atoms.

7. Polypropylene stabilized against degradation at elevated temperatures, comprising solid polyropylene and a stabilizing amount of an N-heterocyclic-γ(dialkylphosphono)butyramide wherein N is part of the heterocyclic ring and each alkyl group has from 1 to 12 carbon atoms.

8. Polypropylene stabilized against degradation at elevated temperatures, comprising solid polypropylene and a stabilizing amount of an N,N-dialkyl-γ(dialkylphosphenyl)butyramide wherein each alkyl group has from 1 to 12 carbon atoms.

9. Polypropylene stabilized against degradation at elevated temperatures, comprising solid polypropylene and a stabilizing amount of an N,N-dialkyl-γ(dialkylphosphinyl)butyramide wherein each alkyl group has from 1 to 12 carbon atoms.

10. Polypropylene stabilized against degradation at elevated temperatures, comprising solid polypropylene and from 0.05 to 1 percent by weight of N,N-dipropyl-γ(dipropylphosphono)butyramide.

11. A composition according to claim 10, which contains from 0.05 to 0.5 percent by weight of 1,3,5-trimethyl-2,4,6-tri(3,5-di-tert-butyl-4-hydroxybenzyl)benzene.

12. A composition according to claim 10, which contains from 0.05 to 0.5 percent by weight of 2,2'-methylene-bis(4-methyl-6-tert-butyl-phenol).

13. A composition according to claim 10 wherein each of said propyl groups is an isopropyl group.

References Cited
UNITED STATES PATENTS 3,044,981   7/1962   Malz _____ 260—45.9

JAMES A. SEIDLECK, *Primary Examiner.*

L. J. BERCOVITZ, *Examiner.*

M. J. WELSH, *Assistant Examiner.*